US012648556B2

(12) United States Patent
Weston et al.

(10) Patent No.: US 12,648,556 B2
(45) Date of Patent: Jun. 9, 2026

(54) VEHICLE SECURITY

(71) Applicant: Ford Global Technologies, LLC, Dearborn, MI (US)

(72) Inventors: Keith Weston, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 18/610,331

(22) Filed: Mar. 20, 2024

(65) Prior Publication Data

US 2025/0295105 A1 Sep. 25, 2025

(51) Int. Cl.
A01M 29/10 (2011.01)
A01M 29/12 (2011.01)
(Continued)

(52) U.S. Cl.
CPC ............ A01M 29/10 (2013.01); A01M 29/12 (2013.01); B60W 50/14 (2013.01);
(Continued)

(58) Field of Classification Search
CPC ...... G06F 3/011; G06F 3/04815; G06F 16/71; G06F 16/735; G06F 16/487; G06F 16/78; G06F 16/9537; H04L 67/12; H04L 67/306; G06T 7/70; G06T 2207/10028; G06T 2207/30196; G06T 2207/30252; G06T 2207/30268; G06T 7/20; G06T 7/50; G09F 19/22; G09F 27/00; G09F 9/35; G09F 25/00; G09F 23/00; G09F 21/00; G09F 19/00; G09F 17/00; G09F 15/00; G09F 13/00; G09F 11/00; G09F 9/00; G09F 7/00; G09F 5/00; G09F 3/00; G09F 1/00; B29B 2009/125; B29B 7/582; B29B 9/065; B29B 9/10; B29B 9/12; B29C 2045/0091; B29C 2045/0093; B29C 44/02; B29C 44/3461; B29C 45/0001; B29C 45/0053; B29C 2033/426; B29C 2037/0039; B29C 33/424; B29C 33/56; B29C 37/0032; B29C 59/02; B29C 31/00; B29C 33/00; B29C 35/00;
(Continued)

(56) References Cited

U.S. PATENT DOCUMENTS 9,452,732 B1    9/2016  Hermann et al.
11,040,593 B1 *  6/2021  Chen .................. B60H 1/00978
(Continued)

FOREIGN PATENT DOCUMENTS

JP    2023028049 A    3/2023
KR    20230090400 A    6/2023

OTHER PUBLICATIONS

Krisher, "Ford's product guru, veteran of tech heavyweights, riffs on Blue Oval's electrified future", Associated Press, Published Jul. 3, 2023, The Detroit News.

*Primary Examiner* — Daniel Previl
(74) *Attorney, Agent, or Firm* — Frank Lollo; Brooks Kushman P.C.

(57)        ABSTRACT

A vehicle may detect an entity within a specified distance of a vehicle, determine that the entity has breached an interior of the vehicle, and based on a status of a vehicle component, actuate the vehicle component in response to detecting the breach of the interior of the vehicle.

20 Claims, 4 Drawing Sheets

(51) Int. Cl.
   *B60W 50/14* (2020.01)
   *G07C 9/00* (2020.01)
(52) U.S. Cl.
   CPC ... *G07C 9/00174* (2013.01); *B60W 2050/143*
   (2013.01); *B60W 2554/40* (2020.02); *B60W*
   *2554/80* (2020.02); *B60W 2556/45* (2020.02)
(58) Field of Classification Search
   CPC ......... B29C 37/00; B29C 39/00; B29C 41/00;
   G11B 27/034; G11B 27/105; G11B
   27/34; H04N 21/4131; H04N 21/41415;
   H04N 21/42203; H04N 21/4223; H04N
   21/4312; H04N 21/4314; H04N
   21/44218; H04N 21/4532; H04N
   21/45452; H04N 5/265; H04N 7/163;
   H04N 7/181; H04W 4/023; H04W 4/21;
   H04W 4/021; H04W 92/00; H04W 99/00;
   H04W 88/00; H04W 84/00; H04W 80/00;
   G10K 11/162; E04B 1/84; E04B
   2001/742; C08J 2201/03; C08J 2201/036;
   C08J 2201/038; C08J 2203/06; C08J
   2203/08; C08J 2203/12; C08J 2203/18;
   C08J 2203/182; C08J 2205/05; C08J
   2359/00; C08J 2359/02; C08J 2367/00;
   C08J 2367/02; C08J 2367/04; C08J
   2371/00; C08J 2377/00; C08J 2377/02;
   C08J 2377/06; C08J 2387/00; C08J
   9/122; C08J 9/127; C08J 9/142; C08J
   9/16; C08J 9/18; C08J 9/232; C08J 9/36;
   C08J 3/00; C08J 5/00; C08J 7/00; C08J
   11/00; C08J 9/00; C08J 99/00; C08J
   2201/00; C08L 23/02; C08L 67/02; C08L
   67/025; C08K 5/103; Y10T 428/24; Y10T
   24/00; Y10T 29/00; Y10T 70/00; Y10T
   74/00; Y10T 82/00

USPC .................. 340/573.2, 568.1, 576, 571, 588,
   340/679–680, 686.1, 691.6, 995.13,
   340/995.17, 438–439, 435–436
See application file for complete search history.

(56) References Cited

U.S. PATENT DOCUMENTS

| 11,653,642 | B2 * | 5/2023 | Salter | G06V 20/56 |
|---|---|---|---|---|
| | | | | 367/139 |
| 2006/0208169 | A1 * | 9/2006 | Breed | G01S 15/88 |
| | | | | 250/221 |
| 2009/0051511 | A1 * | 2/2009 | Tanaka | B60R 25/1009 |
| | | | | 340/426.1 |
| 2012/0111285 | A1 * | 5/2012 | Pearce | F41H 13/00 |
| | | | | 119/712 |
| 2013/0109342 | A1 * | 5/2013 | Welch | G08B 21/22 |
| | | | | 455/404.2 |
| 2014/0306799 | A1 | 10/2014 | Ricci | |
| 2015/0033614 | A1 * | 2/2015 | Allbright, Jr. | A01M 23/18 |
| | | | | 43/60 |
| 2015/0286882 | A1 * | 10/2015 | Nicol | G08B 21/22 |
| | | | | 348/148 |
| 2018/0172825 | A1 * | 6/2018 | Hsu | G01S 7/411 |
| 2018/0209210 | A1 * | 7/2018 | Arndt | B65G 69/28 |
| 2019/0156150 | A1 * | 5/2019 | Krishnan | G06V 20/597 |
| 2020/0130702 | A1 * | 4/2020 | Ferreira | H04W 4/48 |
| 2020/0406860 | A1 * | 12/2020 | Mai | B60R 25/31 |
| 2022/0104457 | A1 * | 4/2022 | Narita | E01H 3/02 |
| 2023/0054457 | A1 * | 2/2023 | Rogan | G08B 13/19663 |
| 2023/0077868 | A1 | 3/2023 | Burns et al. | |
| 2023/0083504 | A1 | 3/2023 | Burns et al. | |
| 2023/0219527 | A1 * | 7/2023 | Amadi | E05B 81/64 |
| | | | | 701/49 |

* cited by examiner

COMM.
MODULE
112

HMI
110

COMPONENTS
108

SENSORS
106

COMPUTER
104

VEHICLE SECURITY

BACKGROUND

Vehicles typically include sensors for collecting data about the vehicle and/or an environment around the vehicle. In some examples, sensor data can be used by vehicle systems to actuate vehicle components.

BRIEF DESCRIPTION OF THE DRAWINGS

FIG. 1 is a block diagram of an example vehicle and vehicle system.

FIG. 3 illustrates an example vehicle detecting an interior breach.

FIG. 4 is a process flow diagram illustrating an example process for actuating vehicle components based on entities proximate to the vehicle.

DETAILED DESCRIPTION

Introduction

Figure 2:
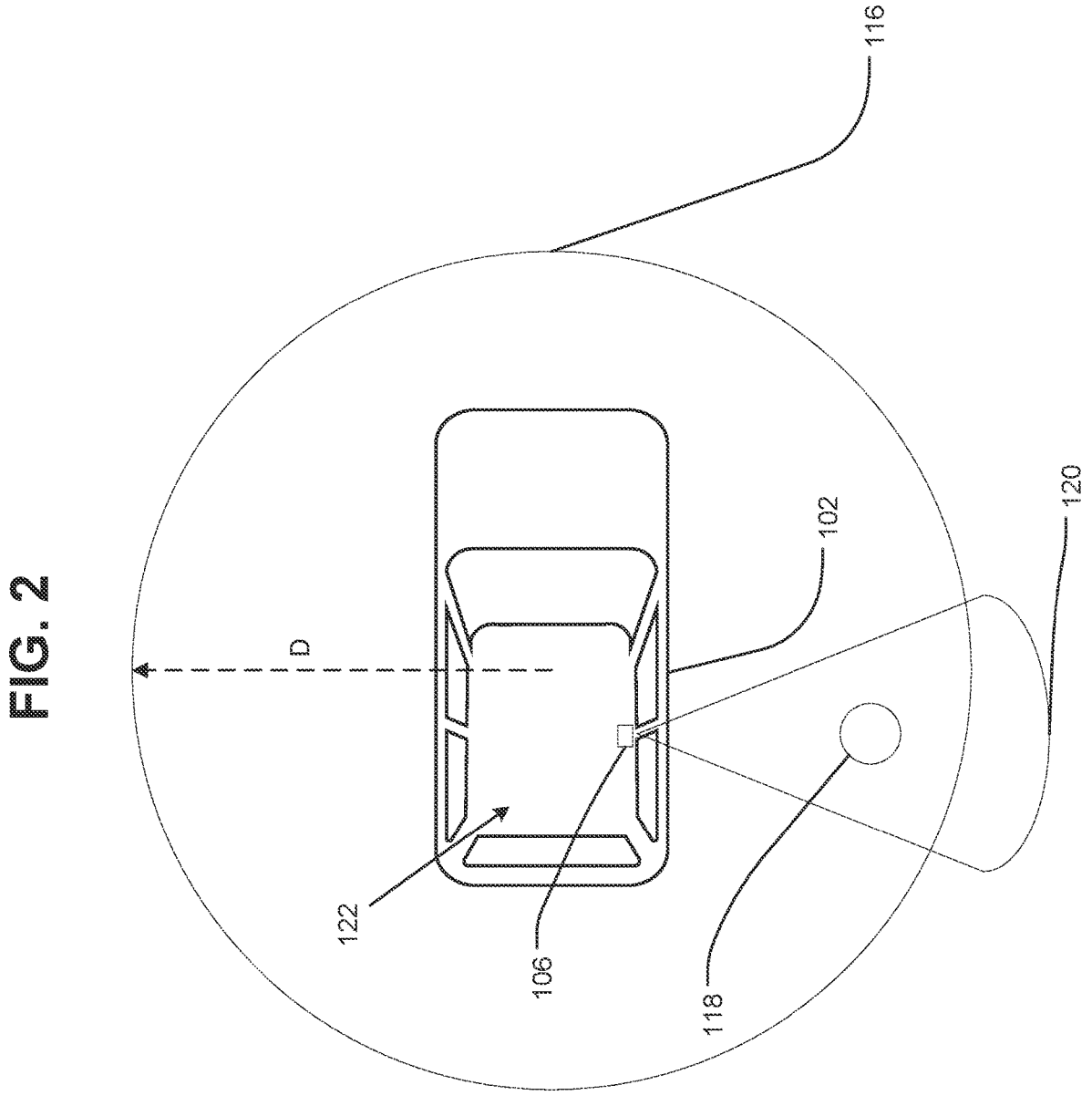
FIG. 2 illustrates an example vehicle detecting an entity.

Described herein are techniques for detecting entities within a distance of a vehicle. A vehicle computer may classify an entity based on data collected by vehicle sensors. The vehicle may then actuate components based on the classification of the entity. For example, the vehicle may output audio, unlock doors, send a message to a remote computer, etc. In examples described herein, the entity is an animal. Vehicle components can be actuated to deter the animal from entering the vehicle and/or to encourage the animal to leave the vehicle.

Accordingly, included in the present disclosure is a system comprising a computer having a processor and a memory, the memory storing instructions executable by the processor to: detect an animal within a specified distance of a vehicle, determine that an animal has breached an interior of the vehicle and, based on a status of a vehicle component, actuate the vehicle component in response to detecting the breach of the interior of the vehicle.

The breach of the interior of the vehicle may include an open door, an open window, or a broken window.

Actuating the vehicle component may include unlocking, opening, or preventing latching of a door.

Actuating the vehicle component may include at least one of outputting audio, actuating a light, and starting an engine.

Actuating a second vehicle component may be based on actuating the vehicle component, actuating a second vehicle component.

Actuating the vehicle component may include sending a message to a remote device.

A second vehicle component may be actuated based on detecting the animal within the specified distance of the vehicle.

Actuating the second vehicle component may include sending a message to a remote device, outputting audio, or locking a door.

Actuating the vehicle component may include outputting a scent.

The scent may be selected based on a determination of a species of the animal.

A method comprises: detecting an animal within a speci- fied distance of a vehicle, determining that an animal has breached an interior of the vehicle and, based on a status of a vehicle component, actuating the vehicle component in response to detecting the breach of the interior of the vehicle.

The breach of the interior of the vehicle may include an open door, an open window, or a broken window.

Actuating the vehicle component may include unlocking, opening, or preventing latching of a door.

Actuating the vehicle component may include at least one of outputting audio, actuating a light, and starting an engine.

Actuating a second vehicle component may be based on actuating the vehicle component, actuating a second vehicle component.

Actuating the vehicle component may include sending a message to a remote device.

A second vehicle component may be actuated based on detecting the animal within the specified distance of the vehicle.

Actuating the second vehicle component may include sending a message to a remote device, outputting audio, or locking a door.

Actuating the vehicle component may include outputting a scent.

The scent may be selected based on a determination of a species of the animal.

Exemplary System Elements

Figure 1:
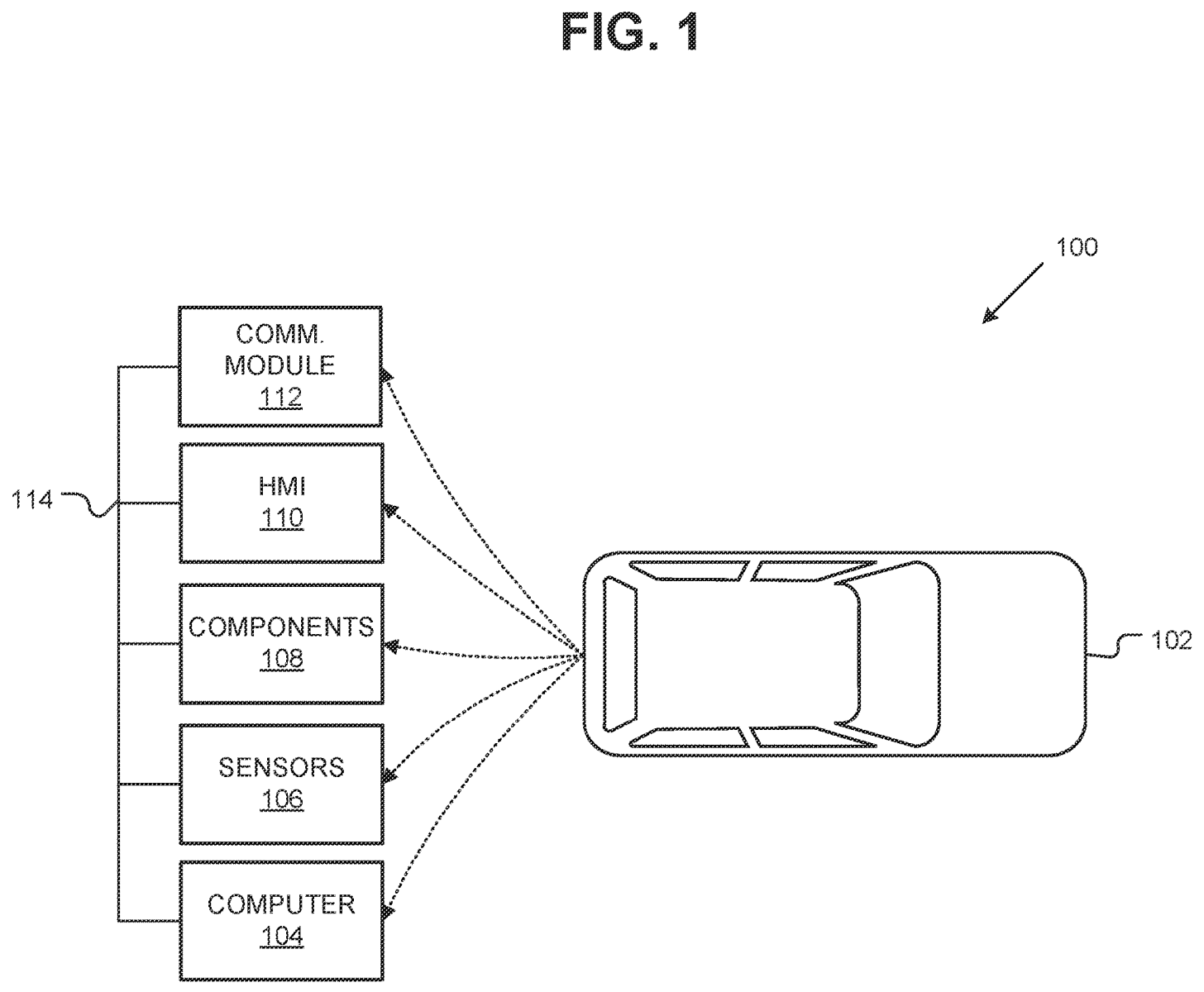

FIG. 1 is a block diagram of a vehicle system 100 for providing sensor data for vehicle operation. The vehicle 102 includes a computer 104 having a memory that includes instructions executable by the computer 104 to carry out processes and operations including as described herein. The computer 104 may be communicatively coupled via a com- munication network, such as a vehicle network 114, with sensors 106, components 108, a human machine interface (HMI) 110 and a communication module 112 in the vehicle 102. The vehicle 102 may be any passenger or commercial automobile such as a car, a truck, a sport utility vehicle, a crossover, a van, a minivan, a taxi, a bus, ICE (Internal Combustion Engine), BEV (Battery Electric Vehicle), Hybrid, etc.

As mentioned above, the vehicle computer 104 (referred to hereinbelow as "vehicle computer 104" or "computer 104") includes a processor and a memory. The memory includes one or more forms of computer readable media, and stores instructions executable by the computer 104 for performing various operations, including as disclosed herein. For example, the computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a par- ticular operation (e.g., an ASIC for processing sensor data and/or communicating the sensor data). In another example, the computer 104 may include an FPGA (Field-Program- mable Gate Array) which is an integrated circuit manufac- tured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL pro- gramming provided pre-manufacturing, whereas logical components inside an FPGA may be configured based on VHDL programming (e.g. stored in a memory electrically connected to the FPGA circuit). In some examples, a com- bination of processor(s), ASIC(s), and/or FPGA circuits may be included in a computer 104.

The memory can be of any type (e.g., hard disk drives, solid state drives, servers, or any volatile or non-volatile media). The memory can store the collected data sent from the sensors 106. The memory can be a separate device from the computer 104, and the computer 104 can retrieve information stored by the memory via the network 114 in the vehicle 102 (e.g., over a CAN bus, a wireless network, etc.) Alternatively or additionally, the memory can be part of the computer 104 (e.g., as a memory of the computer 104).

The computer 104 may include programming to operate one or more of vehicle brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer 104, as opposed to a human operator, is to control such operations.

The computer 104 may include or be communicatively coupled to (e.g., via the vehicle network 114 such as a communications bus as described further below) more than one processor (e.g., included in components 108 such as sensors 106, electronic control units (ECUs) or the like included in the vehicle 102 for monitoring and/or controlling various vehicle components 108 (e.g., a powertrain controller, a brake controller, a steering controller, etc.)) The computer 104 is generally arranged for communications on the vehicle communication network 114 that can include a bus in the vehicle 102 such as a controller area network CAN or the like, and/or other wired and/or wireless mechanisms. Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

Via the vehicle network 114, the computer 104 may transmit messages to various devices in the vehicle 102 and/or receive messages (e.g., CAN messages) from the various devices (e.g., sensors 106, ECUs, etc.) Alternatively, or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

The vehicle 102 typically includes a variety of sensors 106. A sensor 106 is a device that can obtain one or more measurements of one or more physical phenomena. Some sensors 106 detect internal states of the vehicle 102, for example, wheel speed, wheel orientation, and engine and transmission variables. Some sensors 106 detect the position or orientation of the vehicle 102, for example, global positioning system GPS sensors. Some sensors 106 detect objects, for example, radar sensors, scanning laser range finders, light detection and ranging LIDAR devices, and image processing sensors such as cameras. Further sensors 106 detect sounds, for example, dynamic or condenser microphones, piezoelectric transducers, ultrasonic sensors, acoustic emission sensors, etc.

The vehicle 102 includes a variety of audio sensors (e.g., microphones) that can detect sound internal to the vehicle 102 and/or external to the vehicle 102. An audio sensor may include or be connected to an analog-to-digital (A/D) converter to facilitate the conversion of sound waves to electrical signals. As an example, the A/D converter may utilize sampling to convert sound to electrical signals. An audio sensor and/or A/D converter may be in communication with the computer 104 such that the electrical signals may be transmitted to the computer 104. One or more audio sensors may be installed or deployed in or on any suitable part of the vehicle 102 to provide detection of audio phenomena as described herein. For example, audio sensors for capturing sound emitted from or within the interior of the vehicle 102 may be provided in a vehicle dash panel, interior sides of the vehicle 102, the interior of the vehicle roof, etc. As another example, audio sensors for capturing sound emitted exterior to the vehicle 102 may be supported by the exterior sides of the vehicle 102, the exterior of the vehicle roof, in or on vehicle bumpers or fascia, the vehicle hood, etc. Multiple audio sensors may be installed at different positions in or on the vehicle 102 in order to provide sound capture and/or distinguish between multiple sound sources as described herein. The audio sensors may be any suitable type for detecting sound as described herein.

The vehicle 102 may include one or more sound output devices (e.g., speakers). A speaker is a device that can output sound. As an example, a speaker can include a digital-to-analog (D/A) converter that converts electrical signals to vibrations to generate sound at a specified frequency. As an example, the D/A converter may input the electrical signal to a piecewise constant function. A speaker may be in communication with the computer 104 so as to receive electrical signals to be transmitted by the speaker in the form of sound. The speaker may be any suitable type of speaker to output sound internal to the vehicle 102 and/or external to the vehicle 102. A speaker may also operate as a microphone. That is, a device may output audio as well as detect audio. In this document, sound output devices and sensors 106 are referred to as separate elements, though it is to be understood that the operations of a speaker and a microphone could be performed by a single sound device. The speaker may be deployed or installed in or on the vehicle 102 (e.g., in or on a surface of the vehicle 102). As an example, the speaker may be supported by the hood of the vehicle 102 so that output sound is likely to be detectable by listeners positioned in front of the vehicle 102.

Referring now to FIG. 2 as well as FIG. 1, in an example scenario an entity 118 could be detected by the computer 104 from vehicle sensor data. The entity 118 may be any object or entity detectable by the vehicle sensors 106. In various examples described herein, the entity 118 is an animal.

As described above the entity 118 may be any object detectable from data received from vehicle sensors 106. The computer 104 could use any suitable object recognition algorithm or technique to detect and/or classify an object. For example, a neural network could be trained using data collected about objects to classify objects (e.g., to distinguish animals from other objects based on camera sensor data).

The computer 104 may be programmed to classify the entity 118 based on audio data, camera image data, and/or any other suitable data from one or more vehicle sensors 106. The classification may include any suitable technique for object classification. Classifying the entity 118 means determining a type or category of the entity 118 according to any suitable technique. For example, various techniques can be used to analyze data from cameras or other sensors 106 to determine a type or category of entity 118. A type or category of entity 118 means a kind of object, etc., an animal, a bicycle, a vehicle, a rock, etc. Image data used for entity classification and/or other purposes (e.g., determining entity behavior such as direction and/or speed of movements) may be a plurality of images collected at different times. For example, analyzing a plurality of images collected at different times may allow the computer 104 to determine if the entity 118 is walking towards the vehicle 102. The computer 104 could analyze data collected about the entity 118 using a machine learning program or a rules-based program and assign a confidence score to the entity 118 (typically a percentage that indicates an estimated likelihood, e.g., 90%, 99%, etc.) that the entity classification is correct.

The computer 104 can select a classification for a specific entity 118 from stored classifications. The computer, 104, as further described below, can determine a respective one of the classifications for an entity 118. For example, the computer 104 could classify an entity 118 detected within the specified distance D as an animal, and/or could classify the animal as a specific species and/or genus (e.g., bear, elk, dog, golden retriever, German shepherd, labradoodle, etc.)

As seen in FIG. 2, the sensor 106 may be positioned in or on the vehicle 102 to provide a field of view 120 extending relative to the vehicle body. The sensor 106 is typically an imaging sensors and may be any type suitable to detect the entity 118 such as a camera, lidar, radar, etc. In the present example, the sensor 106 is a camera. The field of view 120 can be determined by specifications or parameters of the camera (e.g., a viewing angle providing by the camera) and pose or orientation of the camera (e.g., a pitch, roll, and yaw of an axis of the camera lens relative to a horizontal plane of the vehicle 102). The field of view 120 is referred to as fixed or static when the camera is installed such that its pose cannot be changed. Additionally or alternatively, the camera may be moveably supported by the vehicle 102 and actuatable by the computer 104 such that the camera pose and/or a focus or orientation of a lens can be changed, and field of view 120 thereby dynamically adjusted.

A camera can generate image data of its field of view 120. Image data from a camera typically includes a sequence of image frames from the field of view 120 (i.e., image data may be video data). The image frames can be input to the computer 104 via the vehicle network. 114. The computer 104 can analyze the image frames (e.g., can utilize suitable image recognition techniques) and may make a determination of whether the entity 118 is within a specified distance D of the vehicle 102 as described further below.

The computer 104 may be programmed to detect the entity 118 within the specified distance D of the vehicle 102. The specified distance D is shown in FIG. 2 as a radius of the specified distance perimeter 116. The specific distance perimeter 116 represents the limit of measurement of the specific distance D. The computer 104 may detect the entity 118 and determine that the entity 118 is within the specified distance D of the vehicle 102 (e.g., measured as a radius around a point defined in or on the vehicle 102, as a distance from an edge of a vehicle 102 as defined by a vehicle body, or based on any other suitable reference) based on collected data about the entity 118. The computer 104 can make a determination of the entity 118 being within a specified distance D of the vehicle 102 when it determines that the entity 118, or at least some portion of the entity 118, is detected within a distance of the vehicle 102 that is less than the specified distance D. The detection of the entity 118 within the specified distance D of the vehicle 102 may be based on data captured by the sensors 106. As an example, the data may be image data. The distance may be measured from any selected point on the vehicle 102. As an example, the distance may be measured from the sensor 106 which collected the entity data. As a further example, the distance may be measured from a surface of the vehicle 102 closest to the entity 118.

The specified distance D may be any suitable distance determined by the computer 104 and/or a vehicle operator. In examples, a vehicle operator may select specified distances D based on certain environments. For example, the computer 104 may select a specified distance D from a stored list of specified distances D based on the vehicle 102 entering a geographic location (i.e., the computer 104 could store specified distances D for respective geographic locations, and could retrieve a specified distance D for a location from memory based on data from a location sensor (e.g., a GPS sensor)).

In examples, the computer 104 may determine the specified distance D (i.e., a distance from a vehicle 102 within which detection of an entity 118 triggers classification and interaction with the entity 118) based on characteristics or attributes of a geographic location. For example, the computer 104 may select a higher specified distance D of 20 meters when in geographic locations where vehicles are less likely to be parked closely to one another (e.g., suburban residential neighborhoods or rural locations). On the other hand, the computer 104 may select a lower specified distance D of 10 meters where vehicles are likely to be parked more closely to one another (e.g., an urban location, a parking garage or parking lot, etc.) A lower specified distance D may increase a frequency with which entities are classified and audio is output, and vice versa. Alternatively or additionally, a vehicle operator may select a specified distance D. As an example, if the vehicle operator desires the vehicle 102 to only interact with entities which are close to the vehicle 102, the vehicle operator could set the specified distance D to 1 meter. The vehicle operator may select the specified distance D by any suitable means such as by providing input via a vehicle HMI 110.

The computer 104 may classify the entity 118 before the entity 118 enters the specified distance D (e.g., the computer 104 may classify the entity 118 when the entity enters a range of the sensors 106, which may be greater than the distance D). The specified distance D may then be selected based on the classification of the entity 118. For example, if the entity 118 is classified as a squirrel, the computer 104 could select a specified distance of 1 meter. As another example, the computer 104 could select a specified distance of 20 meters based on the entity 118 being classified as a bear. Thus, an entity 118 which could pose a greater threat to the vehicle 102 (as a bear may be a greater threat than a squirrel) may prompt the computer 104 to actuate components 108 when the entity 118 is further from the vehicle 102 when compared to an entity 118 posing a lesser threat. The "threat" posed by an entity 118 may be based on a "risk score" of an entity as described below.

The computer 104 may be programmed to actuate a vehicle component 108 in response to detecting the entity 118 within the specified distance D, and/or in response to determining that an entity 118 has breached an interior 122 of the vehicle 102 as described in further detail below. The computer 104 may select the vehicle component 108 to be actuated based on the classification of the entity 118. For example, and in keeping with the example 118 entity being an animal, if the computer 104 classifies the entity 118 as a deer, the computer 104 may actuate a light positioned on the body of the vehicle 102 in order to startle the deer and motivate it to move away from the vehicle 102 beyond the specified distance D. As a further example, if the computer 104 classifies the entity 118 as a bear, the computer 104 may actuate a light positioned on the body of the vehicle as well as a sound output device in order to startle the bear and motivate it to leave the specified distance D.

Actuating the vehicle component 108 may include outputting a scent. The vehicle 102 may include a scent module configured to release particles into the air surrounding the vehicle 102 based on a command received from the computer 104. The scent released by the scent module may be any specified scent installed in the scent module, chosen by the computer 104 based on the classification of the entity 118. As an example, if the computer 104 classifies the entity 118 as a bear, the computer 104 may instruct the scent module to release a specific scent that is known to be unpleasant to bears.

Actuating the vehicle component 108 may include sending a communication to a remote device. For example, if the vehicle 104 classifies the entity 118 as a bear, the computer 104 may send a message to a remote device such as a smartphone or the like indicating that a bear is present within the specified distance D.

Actuating the vehicle component 108 may further include starting an internal combustion engine of the vehicle 102 in order to motivate the entity 118 to leave the specified distance D.

The computer can actuate multiple different components 108 simultaneously. Alternatively, or additionally, the computer 104 may end actuation of a first component 108 and actuation a second component 108 in the event that the entity 118 is still detected within distance D after the actuation of the first component 108. As an example, the computer 104 may detect an entity 118 within the specified distance D and classify the entity as a deer. The computer 104 may actuate headlamps. If, after a specified time, the entity 118 is still within the specified distance D the vehicle may actuate a second component 108 such as a vehicle horn.

The component 108 to be actuated by the computer 104 in response to detecting the entity 118 may be based on a determined risk score of the entity 118. The computer 104 may determine the risk score based on data collected by the sensors about the entity. Determining a risk score may be rules-based. That is, when one or more specified conditions are met in the process of analyzing the data, the risk score may be increased or lowered based on the one or more conditions that are met. A specified condition in the present context means any condition or phenomenon detectable by vehicle sensors 106, and which according to programming in the computer 104 can influence the risk score of the entity 118. Examples of specified conditions include a speed with which an entity 118 is approaching the vehicle 102, a decibel level at which the entity 118 is outputting audio, a distance of the entity 118 from the vehicle 102 being within the specified distance D, the species of animal if the entity 118 is classified as an animal, etc. If a specified conditions meets a threshold, the computer 104 may reduce or increase the entity's risk score (e.g., a distance of the entity 118 below the specified distance D could increase the risk score, detecting audio output by an entity 118 above a decibel threshold could increase the risk score, the entity 118 moving away from the vehicle 102 could decrease the risk score, the entity 118 being classified as a bear could increase the risk score, etc.)

The computer 104 could store a table or the like associating specified conditions with risk scores. These associations can be generated from empirical testing or design considerations (e.g., testing how likely an animal at various distances from a vehicle is to attempt to breach the vehicle interior). Further, a detected entity 118 could initially be defined a default risk score (e.g., 50 on a scale of zero to 100) or "threatening" or "non-threatening," where the risk score is a binary determination of whether the entity 118 appears to pose a risk (i.e., is threatening) or does not appear to pose a risk (i.e., is non-threatening). The computer 104 could be programmed so that risk scores below the risk threshold do not trigger action, whereas risk scores at or above the threshold do. The computer 104 could alternatively or additionally store instructions to adjust a risk score based on a speed at which the entity 118 is moving with respect to the vehicle 102 (e.g., a positive speed (i.e., toward the vehicle 102) could result in increasing the risk score, whereas a negative speed (i.e., away from the vehicle 102) could decrease the risk score). For example, the computer 104 could detect an entity 118 within the specified distance D, and further could determine that the entity 118 is approaching the vehicle 102 at a speed of 5 meters per second. The computer 104 could then (e.g., according to a stored table) increase the risk score by 5 points per every 1 meter per second over 1 meter per second that the entity 118 is approaching. In this example, therefore, the entity 118 would be assigned a risk score of 20, and has a risk score below the risk threshold. As another example of a specified condition, the computer 104 could detect that the entity 118 possesses a key or key fob or the like to access the vehicle 102 and therefore reduce the entity's risk score. As a further example, the computer 104 may detect, based on analyzing the data collected about the entity 118, that the entity 118 is swinging an object. The computer 104 may then increase the risk score of the entity 118.

The computer 104 may actuate various vehicle components 108 (e.g., an audio output component 108 as described above) based on the risk score exceeding a threshold, for example, exceeding the default risk score. As an example, a risk score above a risk threshold would result in the vehicle 102 locking vehicle doors, closing windows, and/or sending a message to a remote device, etc. Alternatively or additionally, a risk score below a threshold could result in the computer 104 actuating one or more vehicle components 108.

The risk score could be determined in other ways additional or alternative to initially assigning the default risk score, and may be determined based on any suitable feature or action of the entity 118. As an example, the risk score may be based on the measured decibels of the entity 118 audio. For example, the entity 118 yelling may increase their risk score, whereas the entity 118 speaking below a threshold decibel level may reduce, or not increase, the entity's risk score. The risk score may alternatively or additionally be determined based on physical actions being taken by the entity 118 (i.e., if the entity 118 is swinging their arms and/or holding an object) the risk score of the entity 118 may be increased. Further, the risk score may be increased or decreased based on a speed of the entity 118 measured by the sensors 106 (i.e., if the entity 118 is approaching the vehicle 102 at a specified speed or greater this may increase their risk score).

The computer 104 may be programmed to actuate specific components 108 based on respective risk scores of more than one entity detected within the specified distance D. As an example, a first entity 118 within specified distance D may have a higher risk score than a second entity 118. In such an example, the vehicle may actuate components 108 corresponding to the entity 118 with the higher risk score. If the entity 118 with the higher risk score leaves the specified distance D, the computer 104 may actuate components corresponding to the remaining entity 118 with the lower risk score.

Figure 3:
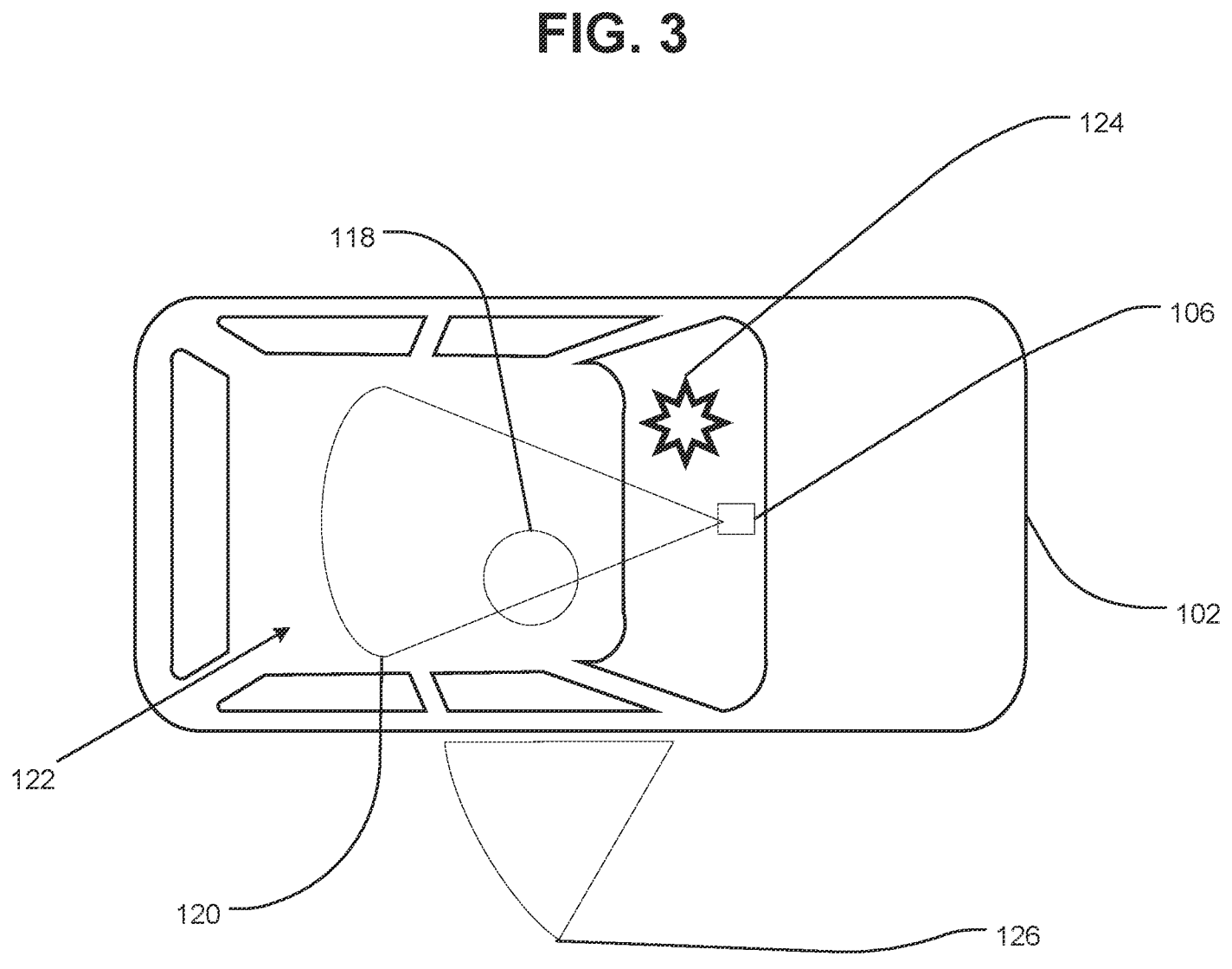

Referring now further to FIG. 3 along with FIGS. 1-2, an example is illustrated in which an entity 118, such as an animal, has breached the interior 122 of the vehicle 102. A breach 124 is shown on a windshield of the vehicle. The "breach" as used herein refers to a non-authorized creation of an access point to an interior 122 of the vehicle 102 by an entity 118 (e.g., breaking a window, forcing open a door or opening an unlocked door, or the like). The breach 124 may include the creation of a point to enter the interior 122 and may include the entity 118 entering the interior 122.

The computer 104 may be programmed to determine that an entity 118 has breached the interior 122 of the vehicle 102. For example, the computer 104 may detect the entity 118 based on data collected from sensors 106 positioned to collect data from the interior 122 of the vehicle 102. The computer 104 can make a determination of an entity 118 having breached the interior 122 of the vehicle 102 when it determines that the entity 118, or at least some portion of the entity 118, is detected within the vehicle 102. The detection of the entity 118 within the vehicle 102 may be based on data captured by the sensors 106. As an example, the data may be image data. Using any suitable technique (e.g., as discussed concerning classifying the entity 118 within the specified distance of the vehicle D) the computer 104 may classify the entity 118 within the interior 122 of the vehicle 102.

The computer 104 may be programmed to determine the position of the entity 118 in the interior 122 based on data collected by the sensors 106. As used herein, a "position" in the interior of a vehicle means a location (i.e., driver's seat, rear right seat, etc.) The position of an entity 118 within the interior 122 is the current, or most recent, location of the entity 118 as determined by the computer 104 based on data collected about the entity by sensors 106. A large entity 118 such as a bear may exist throughout a majority of the interior 122. In such a scenario, the computer 104 could determine the position of the entity 118 based on a majority of the entity 118 being within a "region" of the interior.

As mentioned, the position of the entity 118 may correspond to regions (i.e., areas or volumes) of the interior 122. The interior 122 may be divided into regions; for example, each seat of the vehicle 102 could define a respective region. When the computer 104 determines, based on sensor 106 data, that a majority of the entity 118 is within a region, the computer 104 may determine that the entity's 118 position is within the region. For example, if image data indicates that the majority of an entity 118 is in a position in a region of the vehicle 102 corresponding to the driver's seat of the vehicle 102 (e.g. by showing the entity 118 in the driver's seat) the computer 104 may determine that the entity's 118 position is in the driver's seat.

Additionally, or alternatively, to detecting the entity 118 within the interior 122 of the vehicle 102, the computer 104 may detect a breach 124 of the vehicle 102 as described above. That is, the computer 104 may determine that a breach 124 has been made without detecting an entity 118 within the interior 122 of the vehicle 102. The computer 104 may determine that a breach 124 has been made based on data collected by the sensors 106. As an example, a sensor 106 may collect audio of glass being shattered, or a sensor 106 may detect that a door 126 has been opened. The detection of such events and the detecting of an entity 118 within the specified distance D may be used by the computer 104 to make a determination of a breach 124. The computer 104 may store a lookup table corresponding to data on which determination of a breach 124 may be based. The table may provide instruction to the computer 104 as to what data may indicate a breach 124. Table 1 illustrates an example lookup table that the computer 104 could use to determine a breach 124. Table 1 illustrates a non-exhaustive list of some data upon which a determination of a breach 124 may be made.

TABLE 1

| Data | Explanation |
|---|---|
| Force detected | Sensors 106 detect a force on a surface of the vehicle greater than a selected threshold. The threshold may be based on the classification of the entity. For example, a bear's force threshold may be 1000 Newtons. |
| Door actuated | The computer 104 detects that a door 126 has been actuated or opened and that an access device (e.g. key fob) is not within the specified distance D or a cellular unlock command was not received. For example, a door 126 has been opened. |
| Smashing audio detected | Audio sensors 106 collect audio data indicating breaking force. For example, glass shattering or metal rending. |
| Temperature drop detected | Thermal sensors 106 detect a change in temperature in the interior 122. This may indicate that air has entered the interior 122 via an opening. |
| Entity classified | The computer 104 classifies an entity 118 as an animal and determines that the position of the animal is within the interior 122. |

The computer 104 may be programmed to, based on detecting the entity 118 within the interior 122 of the vehicle 102 or within the specified distance D, actuate a vehicle component 108 as described above. Actuation of the vehicle component 108 may include any of: unlocking a door 126, opening a door 126, preventing latching of a door 126, actuating a light, sending a message to a remote device, etc. The computer 104 may actuate the vehicle component 108 based on the classification of the entity 118. The computer 104 may store a table which corresponds the classification of the entity 118 to the component 108 to be actuated. For example, the entity 118 being classified as a deer may result in actuation of a light whereas the entity 118 being classified as a skunk may result in sending a message to a remote device.

The computer 104 may actuate the vehicle component 108 based on the position of the entity 118 within the interior 122 of the vehicle 102 and/or other factors, such as a type of entity 118. The computer 104 may actuate components 108 based on additional information about the entity 118 such as a species of the entity 118 if the entity 118 is an animal. The computer 104 may select what component 108 to activate based on the position of the entity 118 and the additional information. The computer 104 may further select one or more actuation parameters (i.e., values controlling or governing actuation of the component 108) for the component 108 to be actuated. For example, an actuation parameter could be a duration of actuation, whether to change a status of the component 108, how many times to actuate the component 108, etc. As an example, the computer 104 may reference stored data (e.g., a lookup table or the like) to determine what component 108 to actuate and the actuation type. Table 2 illustrates an example lookup table that the computer 104 could use to determine a component 108 to actuate based on a position and a species of the entity 118. Table 2 illustrates a non-exhaustive list of some components to be actuated based on position and classification of the entity 118.

TABLE 2

| Position | Species | Component | Actuation based on parameters |
|---|---|---|---|
| Within distance D | Bear | Vehicle horn and light | Flash lights and sound horn repeatedly. |
| | Deer | Vehicle light | Continuously shine light towards entity. |
| | Skunk | none | N/A |
| Driver's seat | Bear | Driver's door | If locked, then unlock. When unlocked, open. When opened, keep open. |
| | Deer | Driver's door | If locked, then unlock. When unlocked, open. When opened, keep open. |
| | Skunk | Driver's window | If closed, open. |
| Passenger's | Bear | Passenger's door | If locked, then unlock. When unlocked, open. When opened, keep open. |
| Seat | Dear | Passenger's door | If locked, then unlock. When unlocked, open. When opened, keep open. |
| | Skunk | Passenger's window | If closed, open. |

As shown in FIG. 3, the entity 118 is positioned in the front of the interior 122 of the vehicle. The computer can classify the entity 118 (e.g., as a bear based on data collected by the sensors 106). Further in this example, the computer 104 could determine that the entity 118 is positioned in the front of the interior of the vehicle based on data collected by the sensors 106. Based on the stored data (e.g., lookup table) the computer 104 could determine that the front passenger side door 126 is to be actuated based on the position and species of the entity 118 That is, the computer 104 causes actuation of a door component 108 to open the door 126, and may further provide a command or commands to maintain the door 126 in an open state (e.g., to encourage or allow the entity 118 to exit the vehicle 102). The door 126 may be opened and kept open via any suitable technique such as the actuation of electric or pneumatic components 108.

The actuation of the vehicle component 108 may be based on a status of the vehicle component 108. The computer may determine a status of the component 108 and select how to actuate the component 108 based on the status. For example, if the computer 104 determines to actuate the passenger side door 126, the computer 104 may determine a status of the door 126. If the status of the door 126 is locked and closed, the computer 104 may actuate the component 108 by unlocking and opening the door 126.

Example Processes

Figure 4:
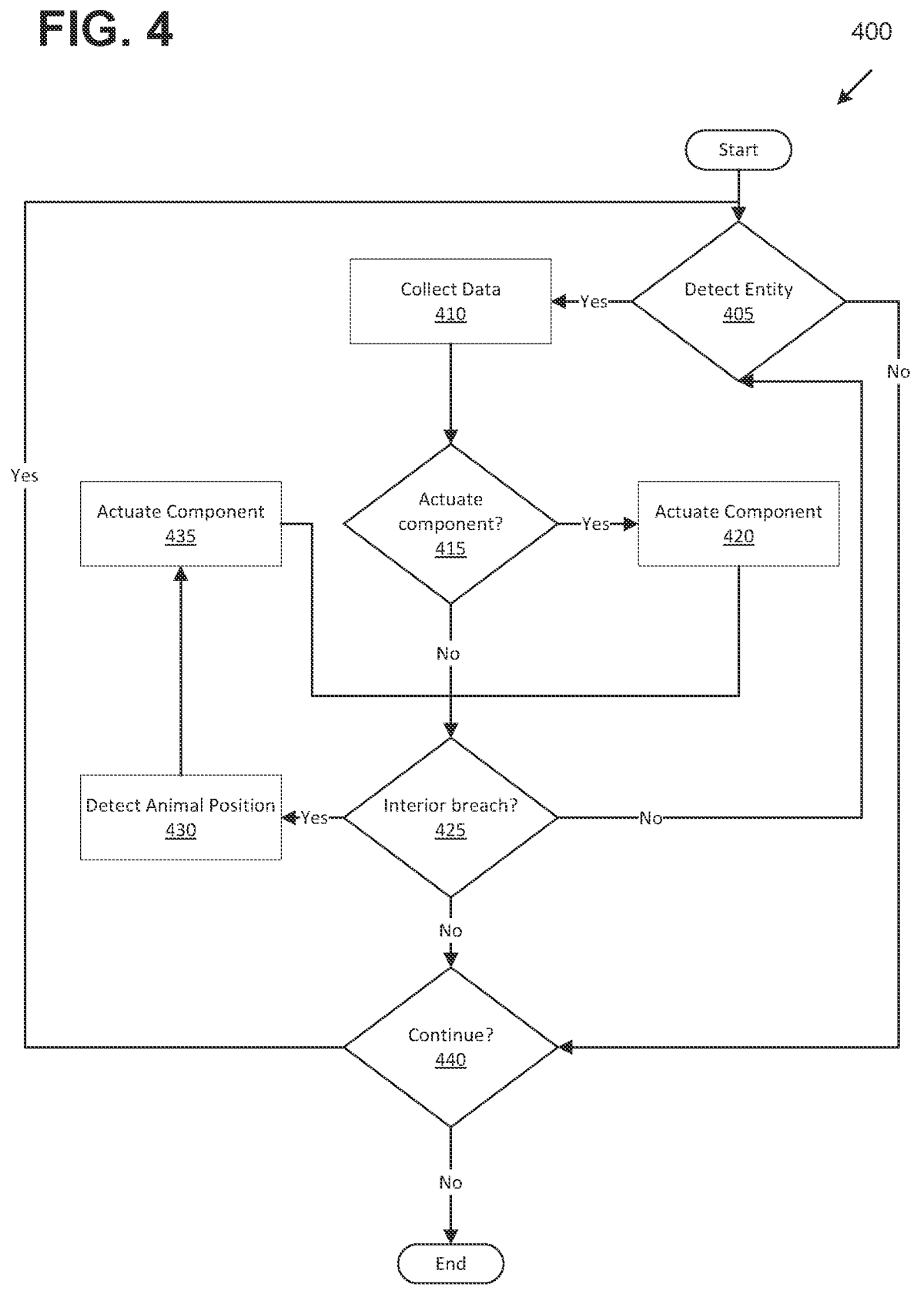

FIG. 4, described with reference to the elements of FIGS. 1-3 which are described above, shows a process flow diagram of an example process 400 for detecting entities within a specified distance D of a vehicle. The process can be carried out according to program instructions executed by the computer 104. The process begins in decision block 405 in which the computer 104 determines whether an entity 118 (e.g., an animal) has been detected. Entity 118 detection is described above. If the computer 104 does not detect an animal within the specified distance D, the process continues in a block 440. Otherwise, the process continues to block 410.

Next, in a block 410, the computer actuates sensors 106 to collect data about the entity 118. In some implementations, when a vehicle is in an ignition OFF state or a PARK state or the like, one or more sensors 106 but not all available vehicle sensors 106 may remain powered up or active to monitor for an entity 118 within the specified distance D as described above. For example, when a vehicle 102 is in a KEY-OFF state or the like, one or more sensors 106 could be provided to monitor vehicle surroundings (e.g., to provide a field or fields of view 120 around the vehicle 102) and detect entities 118. Once an entity 118 is detected, the computer 104 could then actuate the remaining sensors 106 to begin collecting further data about the entity 118. Accordingly, various sensors 106 such as camera sensors or the like may be inactive (e.g., to conserve power while a vehicle 102 is parked) when an entity 118 is detected, and accordingly sensors 106 can be actuated and/activated upon an entity 118 being detected.

Next, in decision block 415, the computer 104 determines whether to actuate the component 108 based on the data collected in block 410. If the computer 104 determines that a component 108 is to be actuated, the computer 104 further determines what component(s) 108 to actuate. The computer 104 may determine what component 108 to actuate based on reference to a lookup table for example, such as described above with reference to Table 2. For example, if the entity 118 is detected within the specified distance D and the entity 118 is a skunk, the computer 104 may determine not to actuate a component 118. Alternatively, or additionally, if the entity 118 detected within the specified distance D is a bear, the computer 104 may actuate an audio component 108 such as a car horn, a light component 108 such as headlights, and a scent component 108 as described above. If both entities 118 are present, the computer 104 may follow protocols assigned to the entity 118 having a higher risk score. As a further example, if the bear is detected in a driver's seat of the vehicle 102, the computer 104 may actuate a driver's side door 126 of the vehicle 102 (see table 2). If the computer 104 determines that a component 108 is to be actuated, the process continues to a block 420. Otherwise, the process continues to a block 425.

In block 420, the computer 104 has determined that a component 108 is to be actuated and determined what component(s) 108 to actuate by, for example, referencing a lookup table. The component 108 is then actuated by the computer 104. The component 108 may be actuated for a specified duration of time or for a specified number of cycles. The duration of actuation may be determined using the aforementioned lookup table as per block 415.

Next, in a decision block 425, the computer 104 determines whether the interior 122 of the vehicle 102 has experienced a new breach 124 based on data collected by the sensors 106 as described above. The computer 104 may also determine if the entity 118 has at least partially entered the interior 122. If the computer determines that no new breach 124 has occurred and that no animal has at least partially entered the interior 122, the process continues to block 440. Otherwise, the process continues to a block 430.

In the block 430, the computer 104 has determined that there is a breach 124 of the interior 122. The computer 104 then determines the position of the animal in or about the vehicle 102 based on data collected by the sensors 106. The sensors 106 may continuously or periodically collect data about the animal and the computer 104 may continuously or periodically determine the position of the animal based on collected data from the sensors 106, such that the computer 104 updates the position of the entity 118 over time.

Next, in a block 435, the computer 104 actuates a component 108 based on the position of the entity 118 in the interior 122 of the vehicle 102. The determination of the component 108 to be actuated may be based on a stored table or the like, as described above. The actuation of the component 108 may include unlocking a door, opening a door 126, opening a window, keeping a door 126 from closing, etc., such that the entity 118 is provided with a convenient route to exit the interior 122. Alternatively, or additionally, if the position of the entity 118 is exterior to the vehicle 102, the component 108 to be actuated may include a light, a horn, a scent module, etc. such that the entity 118 is encouraged to exit the specified distance D. The component 108 to be actuated may change as a position of the entity 118 changes. Accordingly, components 108 being actuated can change over time. As an example, if the computer 104 determines that the position of the entity 118 is the driver's seat, the computer 104 may determine to open the driver side door 126 and prevent the driver side door 126 from closing. If the animal moves to the passenger seat, the computer 104 may open the passenger side door 126 and prevent the passenger side door 126 from closing. The process then continues to block 425 where it is once again determined whether there is a breach. As mentioned above, block 425 includes determining the existence of a new breach 124 or at least partial entry of the interior 122 by the animal.

In a block 440, the computer 104 determines whether to continue the process 400. For example, once the process 400 is initiated, the computer 104 could continue to monitor for entities 118 detected within the specified distance D by returning to block 405. However, the process 400 could end upon some input or event to terminate the process 400 such as a vehicle user commencing operation of the vehicle 102 (e.g., activating a propulsion system such as an engine), a user providing input to end the process, etc. If the process 400 is to continue, then the process returns to the block 405, otherwise the process 400 ends.

Computing devices such as those discussed herein generally each includes commands executable by one or more computing devices such as those identified above, and for carrying out blocks or steps of processes described above. For example, process blocks discussed above may be embodied as computer executable commands.

Computer executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (i.e., a microprocessor) receives commands (i.e. from a memory, a computer readable medium, etc.) and executes these commands, thereby performing one or more processes, including one or more of the processes described herein. Such commands and other data may be stored in files and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer 104 (i.e., by a processor of a computer 104). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 104. Common forms of computer-readable media include, for example, RAM, a PROM, an EPROM, a FLASH-EEPROM, any other memory chip or cartridge, or any other medium from which a computer 104 can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Examples are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. It will be understood that the usage of the terms "first" and "second" are merely identifying and not necessarily indicative of priority.

The invention claimed is:

1. A system, comprising a computer having a processor and a memory, the memory storing instructions executable by the processor to:

detect an animal within a specified distance of a vehicle;

determine that an animal has breached from an exterior of the vehicle to an interior of the vehicle; and based on a status of a vehicle component, actuate the vehicle component in response to detecting the breach from the exterior of the vehicle to of the interior of the vehicle.

2. The system of claim 1, wherein the breach from the exterior to of the interior of the vehicle includes an open door, an open window, or a broken window.

3. The system of claim 1, wherein actuating the vehicle component includes unlocking, opening, or preventing latching of a door.

4. The system of claim 1, wherein actuating the vehicle component includes at least one of outputting audio, actuating a light, and starting an engine.

5. The system of claim 1, further comprising, based on actuating the vehicle component, actuating a second vehicle component.

6. The system of claim 1, wherein actuating the vehicle component includes sending a message to a remote device.

7. The system of claim 1, further comprising actuating a second vehicle component based on detecting the animal within the specified distance of the vehicle.

8. The system of claim 7, wherein actuating the second vehicle component includes sending a message to a remote device, outputting audio, or locking a door.

9. The system of claim 1, wherein actuating the vehicle component includes outputting a scent.

10. The system of claim 9, wherein the scent is selected based on a determination of a species of the animal.

11. A method comprising:

detecting an animal within a specified distance of a vehicle;

determining that an animal has breached from an exterior of the vehicle to an interior of the vehicle; and based on a status of a vehicle component, actuating the vehicle component in response to detecting the breach from the exterior to of the interior of the vehicle.

12. The method of claim 11, wherein the breach from the exterior to of the interior of the vehicle includes an open door, an open window, or a broken window.

13. The method of claim 11, wherein actuating the vehicle component includes unlocking, opening, or preventing latching of a door.

14. The method of claim 11, wherein actuating the vehicle component includes at least one of outputting audio, actuating a light, and starting an engine.

15. The method of claim 11, further comprising, based on actuating the vehicle component, actuating a second vehicle component.

16. The method of claim 11, wherein actuating the vehicle component includes sending a message to a remote device.

17. The method of claim 11, further comprising actuating a second vehicle component based on detecting the animal within the specified distance of the vehicle.

18. The method of claim 17, wherein actuating the second vehicle component includes sending a message to a remote device, outputting audio, or locking a door.

19. The method of claim 11, wherein actuating the vehicle component includes outputting a scent.

20. The method of claim 19, wherein the scent is selected based on a determination of a species of the animal.

\* \* \* \* \*